Dec. 12, 1944.  J. Z. FEIGELSON  2,364,842
VEHICLE CONSTRUCTION
Filed Oct. 25, 1941   2 Sheets-Sheet 1

Inventor
J. Z. FEIGELSON
By Lester B. Clark.
Attorney

Dec. 12, 1944.  J. Z. FEIGELSON  2,364,842
VEHICLE CONSTRUCTION
Filed Oct. 25, 1941  2 Sheets-Sheet 2

Inventor
J. Z. FEIGELSON
By Lester B. Clark.
Attorney

Patented Dec. 12, 1944

2,364,842

UNITED STATES PATENT OFFICE 2,364,842

VEHICLE CONSTRUCTION

Julius Z. Feigelson, Beaumont, Tex.

Application October 25, 1941, Serial No. 416,478

6 Claims. (Cl. 280—124)

This invention relates to heavy duty vehicles and more particularly to trailers of the type which are equipped with pneumatic tires and are attached to a motor truck or other towing self-propelled vehicle and are designed to cooperate with the tractor vehicle to support and transport loads of considerable length and weight.

The primary object of the invention is to provide a device of the class described which is simple in construction and which is sturdy and efficient in use.

Another object is to provide a vehicle in which the load is supported upon springs extending transversely to the line of draft, the construction being such that no direct connection is required between the vehicle's bolster and the spring ends.

Another object is to provide a vehicle in which fore and aft movement of the load supporting bolster is avoided.

Still another object is to eliminate load sway occasioned from high loading and irregularities of surface over which the vehicle passes.

A further object is to provide a vehicle in which the direct connection between the bolster and the spring ends is eliminated.

Still another object is to provide a construction by which upward movement of the load support structure relative to the chassis is limited.

It is also an object to provide a vehicle construction which avoids both transverse and fore and aft movements and combinations thereof which tend to produce a zig-zag movement of the load and a resultant irregular line of travel by the vehicle.

The foregoing objects are primary objects and will be more fully apparent, together with other objects, from a consideration of the following description taken in connection with the accompanying drawings in which.

Figure 1:
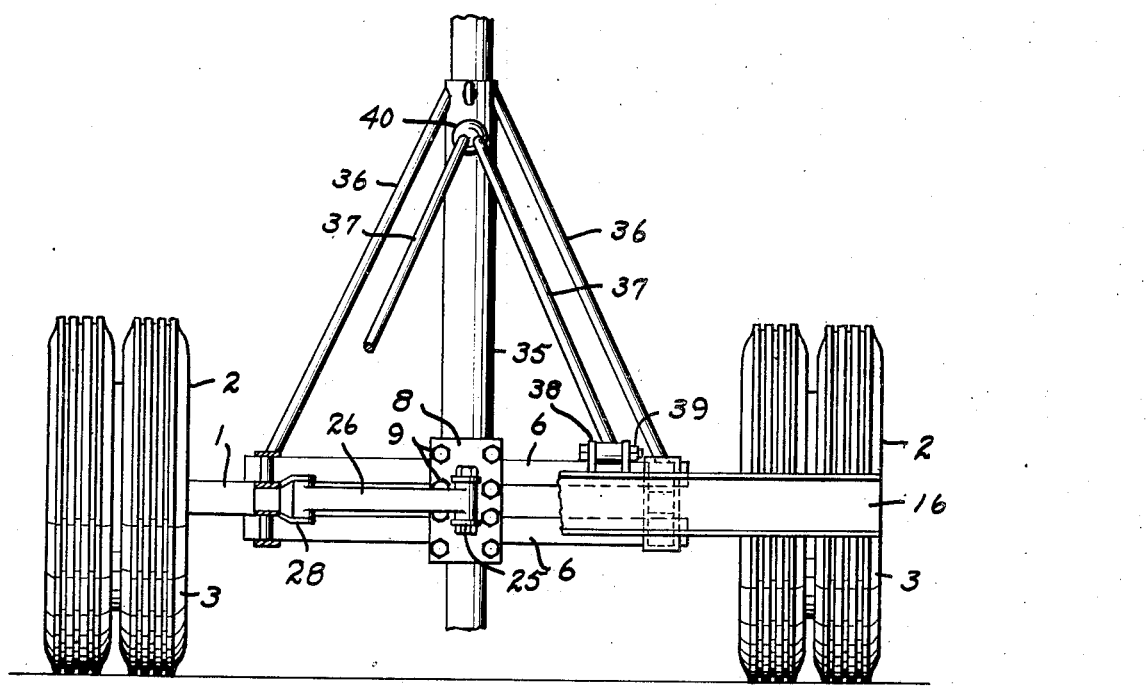
Fig. 1 is a top view of a portion of a trailer embodying the invention, parts being cut away to more clearly show novel features of the construction.
Figure 2:
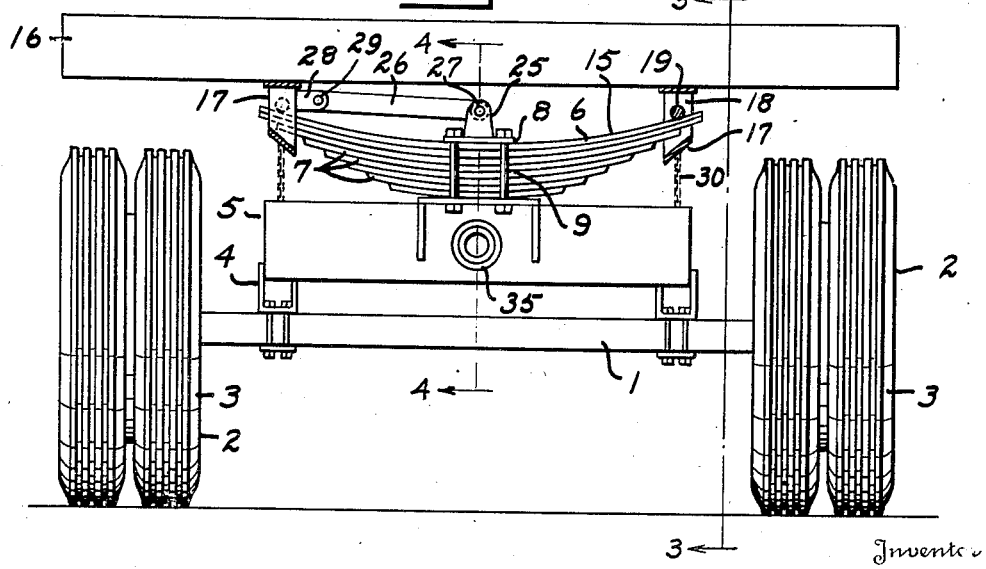
Fig. 2 is a rear elevational view of the construction shown in Fig. 1.
Figure 3:
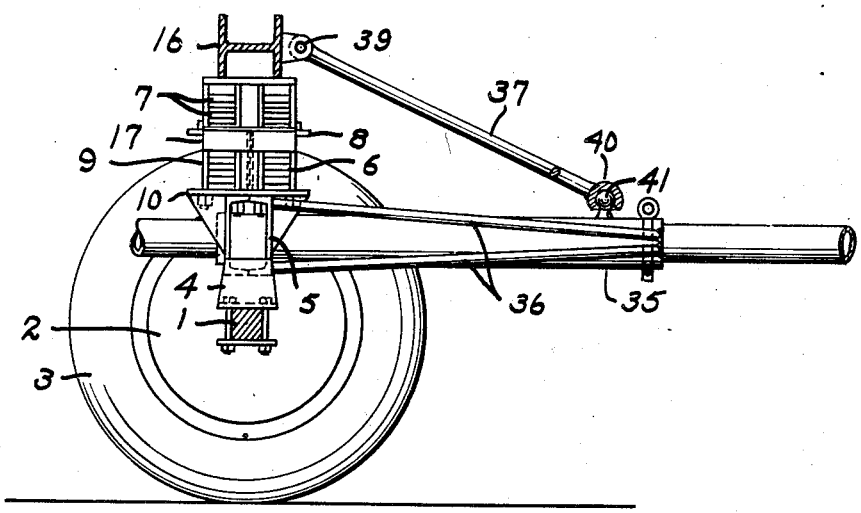
Fig. 3 is a sectional view in elevation taken on line 3—3 in Fig. 2.
Figure 4:
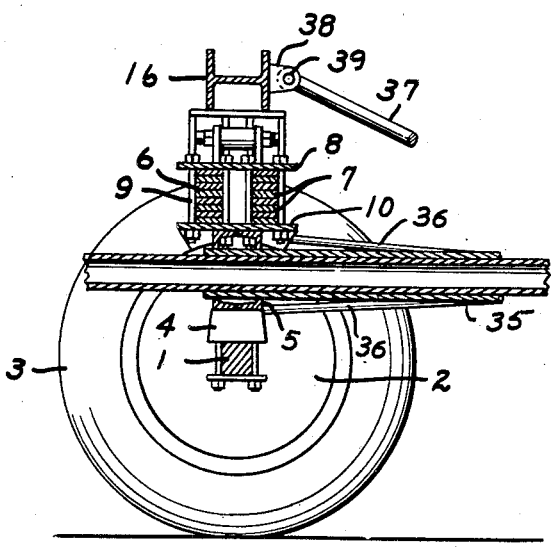
Fig. 4 is a sectional elevation view taken on line 4—4 in Fig. 2.

The embodiment of the invention illustrated in the drawings comprises an axle 1 which is supported at each end upon the wheels 2 provided with tires 3. It is to be understood that dual wheels as shown may be used or single wheels may be utilized as is well known in the art.

Mounted upon support legs 4 on the axle 1 is a transverse sill 5 adapted to support the load to be carried by the wheels 2. In turn there is secured centrally of the sill 5 a spring or pair of springs 6 comprising a plurality of flexible leaves 7 which are held in nested relation by means of a clamp which comprises a saddle member 8 surmounting the springs 6 and securely clamped thereto by means of clamp bolts 9 passing through openings in a sideward extension 10 on the upper flange of the sill 5. It is to be noted that the spring 6 has an upwardly facing arcuate surface 15, there being no eyes or specially finished ends thereon. This feature of the construction eliminates certain difficulties and cooperates with other elements of the novel construction of the invention to obtain desirable features of operation that will more fully appear.

Figure 5:
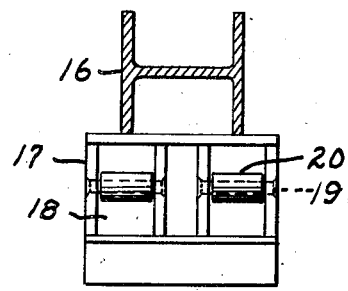
Fig. 5 is a detail of the spring guide comprising an element of the invention.

A load supporting member or bolster 16 surmounts the assembly thus far described and includes spaced spring guides 17 which are secured thereto and have openings 18 through which the ends of the springs 6 pass. Extending transversely of each of the openings 18 is a support pad or pin 19 which engages the arcuate surface 15 of the spring whereby the load to be supported is resiliently carried. It may be here noted that the support pad or pin 19 may constitute a metal contact with the arcuate surface 15 or, if desired, as best shown in Fig. 5, the pins 19 may be provided with anti-friction bearings 20.

In order to maintain a bolster 16 and the load thereon properly positioned relative to a medial plane through the carriage assembly, the saddle member 8 is provided with a bifurcated upwardly extending projection 25 which receives one end of a torque arm 26 and a pivotal connection is effected therebetween by means of the pin 27. The opposite end of the torque arm 26 is attached to the load supporting assembly through spaced brackets 28 integral with one of the spring guides 17, a pin 29 passing through the brackets 28 and the torque arm. The pivoted connection between the torque arm 26 and the interconnected members is preferably of such construction that only pivotal movement is permitted so that the torque arm serves the dual function of maintaining the bolster in desired transverse position relative to the carriage assembly and also preventing the bolster from tipping forward or backward from any tendency of the supported load to move forward or backward. Such construction, however, necessitates the use of a guiding yoke or like structure shown and hereafter explained as comprising arms 36 and 37 to prevent tipping of the bolster from fore and aft shifting tendencies of the supported load.

The torque arm or arms 26 hold the bolster 16 and the load thereon centrally of the spring 6 and there will be slight sliding movement between the arcuate surface 15 and the free ends of the spring pads or pins 19.

If the vehicle embodying the invention is operated over rough terrain, the chains 30 or a suitable type of shock absorber will restrain the spring pads 19 from leaving the arcuate surface 15 on the springs 6. These chains slack slightly upon loading of the springs and hence serve not only to restrain the members 19 from leaving the arcuate surface 15 but also prevent excessive tipping in event of unequal loading.

A coupling pole guide 35 is secured to the sill 5 and receives and is adjustably connected to the coupling pole passing therethrough. Paired arms 36 are attached to the guide member 35 and have their opposite ends connected to the sill 5. The arms 36 and the guide member 35 provide an adequate connection between the coupling pole and the supporting assembly.

Additional paired brace arms 37 may be provided to resist tipping of the spring and bolster assembly. These arms are attached to ears 38 on the forward face of the bolster 16. At their forward ends these arms merge in a head 40 provided with a spherical internal cavity which fits about a head 41 secured to the guide 35. This structure provides a universal connection between the yoke assembly and the guide member 35 and thus permits free vertical and tilting movement of the bolster 16 and the load supported thereby. At the same time, however, the spring assembly is restrained from forward or diagonal tilting or canting and thus the tendency for irregular travel of the direction due to load shifting is minimized. As previously pointed out, however, the torque arm 26 and its connections with projection 25 and bracket 28 may be such as to prevent tipping of the spring and bolster assembly and in such event the arms 37 may be dispensed with and it is intended that this feature is not imperative in the structure of the invention.

Broadly, the invention comprehends a vehicle construction of the class described which is simple in construction and which is sturdy and effective in the transportation of heavy loads.

What is claimed is:

1. In a vehicle construction, a sill, a guide member attached thereto and extending therefrom, paired converging arms attached to said sill and said guide member, a transverse spring mounted on said sill and presenting an upwardly facing arcuate load supporting surface, a bolster resting upon said surface proximate its ends, a saddle member clamped centrally of said spring, a torque arm pivotally attached to said saddle and bolster to restrain said members from relative lateral movement, and a brace yoke assembly having its spaced ends pivotally attached to the bolster and a universal connection between the opposite end of the yoke member and the guide member.

2. In a vehicle construction, a sill, a guide member attached thereto and extending transversely therefrom, paired converging arms attached to said sill and said guide member, a transverse spring mounted on said sill and presenting an upwardly facing arcuate load supporting surface, a bolster resting upon said surface proximate its ends, a saddle member centrally of said spring, and a torque arm pivotally attached to said saddle and support members and operable to restrain said members from relative lateral and tilting movement.

3. In a vehicle construction the combination of a spring assembly including a transverse spring, having an upwardly facing arcuate surface, a bolster above said spring, spring guides attached to said bolster and extending downwardly fore and aft of the ends of the spring, support pads in said guides in engagement with said surface proximate the spring ends, and an arm pivotally connected to one of said guides and the spring assembly to prevent side sway.

4. The combination of a vehicle spring structure where the load leaf has a flat smooth end having no connections thereon, a bolster, a spring guide fixture to rest on and near the ends of the spring, said fixtures fitting over the spring end to restrain fore and aft movement of the bolster, and means pivoted to the spring and one fixture to prevent side sway.

5. The combination of a vehicle spring structure where the load leaf has a flat smooth end having no connections thereon, a bolster, a spring guide fixture to rest on and near the ends of the spring, said fixtures fitting over the spring end to restrain fore and aft movement of the bolster, and means pivoted to the spring and one fixture to prevent side sway and tilting.

6. The combination of a vehicle spring structure where the load leaf has a flat smooth end having no connections thereon, a bolster, a spring guide fixture to rest on and near the ends of the spring, said fixtures fitting over the spring end to restrain fore and aft movement of the bolster, means pivoted to the spring and one fixture to prevent side sway and tilting, and additional means pivoted to the bolster and to the vehicle structure to prevent tilting of the spring.

JULIUS Z. FEIGELSON.